(12) United States Patent
Charles

(10) Patent No.: US 8,280,947 B2
(45) Date of Patent: Oct. 2, 2012

(54) METHOD FOR DISTRIBUTING COMPUTING BETWEEN SERVER AND CLIENT

(75) Inventor: John Francis Charles, Blackburn (AU)

(73) Assignee: AirSCAPE Technology Pty. Limited, Sydney (AU)

( * ) Notice: Subject to any disclaimer, the term of this patent is extended or adjusted under 35 U.S.C. 154(b) by 596 days.

(21) Appl. No.: 11/908,962

(22) PCT Filed: Mar. 16, 2006

(86) PCT No.: PCT/AU2006/000342
§ 371 (c)(1),
(2), (4) Date: Sep. 17, 2007

(87) PCT Pub. No.: WO2006/096919
PCT Pub. Date: Sep. 21, 2006

(65) Prior Publication Data
US 2008/0189358 A1    Aug. 7, 2008

(30) Foreign Application Priority Data

Mar. 16, 2005  (AU) .................................. 2005901312

(51) Int. Cl.
G06F 15/16 (2006.01)
(52) U.S. Cl. ......................... 709/203; 709/222; 709/200
(58) Field of Classification Search .................. 709/203, 709/200, 201, 204, 205, 220–222; 715/700–866; 719/315, 328; 717/173, 168–171
See application file for complete search history.

(56) References Cited

U.S. PATENT DOCUMENTS

| | | | |
|---|---|---|---|
| 6,226,654 B1 | 5/2001 | Van Hoff | |
| 6,874,143 B1* | 3/2005 | Murray et al. | 717/173 |
| 7,107,279 B2* | 9/2006 | Pociu | 1/1 |
| 2003/0158975 A1* | 8/2003 | Frank et al. | 709/331 |
| 2004/0034860 A1* | 2/2004 | Fernando et al. | 719/315 |
| 2004/0093597 A1 | 5/2004 | Rao et al. | |
| 2004/0123270 A1 | 6/2004 | Zhuang et al. | |
| 2005/0086587 A1* | 4/2005 | Balz | 715/505 |
| 2005/0193382 A1 | 9/2005 | Goring et al. | |
| 2005/0216834 A1 | 9/2005 | Gu | |

FOREIGN PATENT DOCUMENTS

| | | |
|---|---|---|
| EP | 1562113 | 8/2005 |
| GB | 2409793 | 7/2005 |
| WO | 2005/031574 | 4/2005 |
| WO | 2005/062695 | 7/2005 |

OTHER PUBLICATIONS

International Search Report issued in PCT/AU2006/000342 mailed on Jun. 26, 2006, 3 pages.

* cited by examiner

*Primary Examiner* — Wing Chan
*Assistant Examiner* — Ruolei Zong
(74) *Attorney, Agent, or Firm* — Osha • Liang LLP

(57) ABSTRACT

A method and system for use in running a display-based computer application, the computer application comprising a plurality of application segments, where computing is distributed between a server and a client computer. The method comprises the steps of providing a generic client engine (20) to the client computer, the client engine comprising an application manager (24), one or more display managers (22), and one or more load managers (26), providing a collection of individual application subset definition files (18), each relating to one of said application segments, wherein, on receipt of successive application subset definition files from the server, the client recursively transforms to provide the respective application segments. The invention has broad utility in a wide variety of display-based computer applications, particularly in wireless applications.

23 Claims, 11 Drawing Sheets

METHOD FOR DISTRIBUTING COMPUTING BETWEEN SERVER AND CLIENT

FIELD OF THE INVENTION

The present invention relates to the field of computer operating environments. In particular, it relates to a method for distributing computing between server and client machines, and can be used to provide Java application programs for rich display environments, such as windows-based computer applications. The invention is particularly applicable to wireless applications.

BACKGROUND OF THE INVENTION

Prior to the arrival and adoption of the World Wide Web or Internet, the development of sophisticated client-server applications was generally a skill undertaken by highly skilled software developers. With the introduction of the Internet, along with open standards such as HTML and the plethora of tools available for web page developers, this high level of skill has become unnecessary, at least on the client-side. In the era of the Web, graphic artists and other parties are readily able to construct the client-side of a web site or an entry-level web-based application, the software engineers and developers relegated to the role of designing and developing the server-side business logic and architectures.

The current paradigm, then, involves relatively low-cost resources developing the client-side of Internet offerings, and more expensive professional software engineers designing and developing the server-side components. In recent times, particularly as companies and organisations have concentrated on migrating large-scale enterprise applications to the Internet, a number of problems have become apparent. These include poor performance, particularly in the low bandwidth arena, and lack of client-side robustness, due to the inherent inefficiencies of HTML as an application mark-up language.

With respect to the use of HTML, there is generally very limited capability to create 'windows-style' or rich multi-display GUI applications, particularly with densely compacted component layouts. In addition, the lack of intrinsic browser-based client-side intelligence tends to force the majority of the processing activity onto the server, resulting in a very high level of browser-client-Web-Server interaction, particularly when compared with the client-server predecessors. This can lead to real problems in low bandwidth environments.

HTML was designed with document publication in mind, so HTML applications largely lack the user interface functionality of conventional client-server applications (multiple windows, drag-and-drop capabilities, spreadsheet features, etc). Generally speaking, of course, HTML applications require a new page to be served at each user interaction, each page occupying a large footprint. All this leads to significant disadvantages in terms of user productivity. The addition of client-side scripting languages, such as Java Script and ActiveX, have helped offload some server-side processing to the client, but have not addressed problems in layout around the Document Object Model (DOM) where HTML remains the layout backbone. Moreover, data transfer between the browser-based client and the web server are not compressed, resulting in far greater data transfer requirements than the client-server predecessors (again, a problem in low bandwidth environments).

A number of the drawbacks referred to above, and in particular the volume of information transfer between the web server and the client, are related to the need, at each service request, for the entire client to be reloaded, including all of the client's layout information. HTML, of course, is essentially a single-display model, in contrast to traditional multi-display client-server applications.

The drawbacks discussed above can have a particularly acute impact in the Internet-based, wireless environment, due to the necessary resource limitations in terms of memory, bandwidth and operating/file systems In the traditional thin client development model, for each application subset each set of main classes and window specific classes is different. Each subset must be separately developed and tested, and must then be loaded separately. As total business applications require many different application subsets, this can lead to high bandwidth requirements or poor performance. The more display components or windows in an application subset—with the associated business logic and event handling code for each component or window—the greater the overall size of the specific client.

Some recent developments have led to improvement in the situation. However, web-based client-side Java-based applications developed have still tended to involve essentially fat clients, which become fatter still as new functionality and features are added. This relegates the use of sophisticated client-side Java-based application to the realm of high-bandwidth environments.

The present invention seeks to address at least some of the problems referred to above.

SUMMARY OF THE INVENTION

According to the present invention in a first aspect, there is provided a method for use in running a display-based computer application, the application comprising a plurality of application segments, involving distributing computing between a server on a server computer and a client on a client computer, the server and client computers operatively interconnected by way of a computer network, the method comprising the steps of:

providing a generic client engine to the client computer, the client engine comprising an application manager, one or more display managers, and one or more load managers;

providing a collection of individual application subset definition files each relating to one of said application segments;

wherein, on receipt of successive application subset definition files from the server, the client recursively transforms to provide the respective application segments.

An application subset definition file may define components or layout characteristics within one or more display areas (such as windows) associated with the respective segment. Preferably, an application subset definition file defines only information relating to component or layout characteristics to be added or removed between successive segments.

In a further aspect, the invention provides a computer program embodied on a computer readable medium for carrying out the above method.

The method of the invention is therefore able to provide a business solution which comprises a collection of segments, by way of the generic client engine and the individual application subset definition files. To run the business solution, the client engine is loaded or installed only once, to then be resident on the client machine. The client is then able to transform itself using the application subset definition files, the client maintaining state-information between client-server requests/responses, the definition files utilised to incrementally update the client.

The generic client engine of the present invention will be referred to herein as a 'smart client', owing to its ability to recursively transform itself to provide the application subsets that together make up the complete business application. This is in contrast to the 'thin client' solutions of the prior art, that assemble business applications from individually downloadable components, each of which has its own application management logic, layout structure and event handling (and hence code). It will be thus realised that a smart client approach allows complex display-based business applications to be constructed from less downloaded data.

Moreover, adopting the thin client approach of the prior art requires the download of an entirely new set of components when a different business application is to be run on the device. In contrast, the generic client engine of the present invention, having already been downloaded and cached on the client device, may be used to generate any type of business application, with only new application subset definition files needing to be downloaded to assemble the business application.

The smart client of the invention, like thin clients of the prior art (such as Java applets) is adapted to be executed on an operating system-independent virtual machine, making for a far more convenient port of the client to a different operating system. However, the 'smart client' of the present invention provides the additional benefit that it allows for a more efficient port of entire business applications from one operating system to another. Unlike the prior art, where each component for each and every business application must be separately ported, in the invention, only the generic client engine need be ported, which can then generate any business application from within the new operating environment.

The smart client of the present invention utilises a well-defined internal architecture of a generic client engine to allow the generation of rich business applications on client devices in low bandwidth environments such as in wireless networks. Whilst network bandwidth is improving, the cost of running business applications, particularly over cellular wireless networks continues to require strategies to be developed to minimise data download volume.

The smart client approach provides many of the benefits of conventional dedicated fat clients or browsers (>≈3-5 MB), however in the download footprint of a thin client (<≈150 kb). This is at least two orders of magnitude size reduction over a conventional fat client.

The application manager is adapted to run as a separate client-side layer, to manage variables associated with each application segment. The application manager includes:
 controlling means for controlling interaction between resident display areas;
 loading means for asynchronous loading of images into display areas;
 a caching means for controlling caching;
 parsing means for parsing application subset definition files.

The parsing means is preferably adapted for parsing compressed application definition files.

The caching means preferably includes means to destroy in the client memory cached images for an application segment when initiating the caching of cached images for a subsequent application segment.

The application manager may include one or more of:
 gateway placeholder means for short-duration instantiated objects;
 memory management means between application subset transitions;
 storage means for hash tables, arrays and variables;
 interface means to online/offline cache control management classes.

The method does not employ interlinked code-generated applets, but instead employs the single generic engine, which dynamically and recursively transforms itself on receipt of instructions interpreted by said parsing means from application subset definition files received from the server.

The one or more display managers may include one or more of the following functionalities:
 Initialisation and construction means;
 Component and sub-component layout means;
 Data validation means;
 Event handling means;
 Means for data synchronisation across display subset transitions both internally within an application subset and externally across application subsets;
 Means for storage of component/container objects and associated component/container information.

The one or more load managers may include one or more of the following components:
 URL parser means to asynchronously load and parse remote application subset definition files by way of URL parser threads;
 Watchdog means configured to be instantiated by the URL parser means to perform a timeout on a URL parser thread;
 AsyncLoader means configured to be instantiated at the end of a URL parser thread lifespan.

The generic client engine of the invention may further include one or more publication managers, configured to periodically check the connection status with said server computer and to invoke delivery of client-side stored data to the server computer.

The method of the invention may be implemented in a browser-dependent or a browser-independent manner.

The difference between the present invention and the conventional approach revolves essentially around the location of presentation knowledge. In a conventional IDE (Integrated Development Environment), the component and layout knowledge for an application is incorporated into each distinct applet, representing a snippet of the overall application. This applet is linked to another applet that manages the presentation of the next piece of the application. Any code re-use is carried out not on the client-side, but in the IDE. Therefore an applet that differs in only minor ways from the preceding applet still needs to be downloaded fully, as it is treated at the client-side as a completely different piece of information.

In contrast, in the present invention, the knowledge can be built into the builder engine, which contains an inherent instruction set and resides on the client machine. The inherent instruction set of the engine includes a generic display manager object to manage all the layout and components within a display area, and an application management layer to manage issues associated with an entire application segment. This means that instead of loading a multiplicity of applets for a total business solution, a single generic applet is loaded, able to dynamically and recursively transform itself under instruction via application definition files based upon a simple client-side application definition mark-up language. In the browser-dependent implementation, the generic applet is cached on the client machine and remains resident for the duration of the cache expiry period. The same cached generic applet can also be used by other specific applications at the same URL.

In the browser-independent implementation the invention provides important additional benefits. Once the generic client is installed on the client machine, it can be used by applications hosted across any number of URLs, since the need for client caching is removed.

The invention thus provides an instruction set rendering engine with a relatively small footprint. The user interface operations are, for the most part, processed locally due to intelligent client-side processing. The engine maintains the application user interface state information during each session, and so only small, incremental updates are needed for intermediary requests. For example, a component of a spreadsheet page can be updated without needing to refresh the entire page. Once all requests within an application subset are complete, a final update or other request performs a drill-down to transform the application into the next segment of the total business application.

The net result is that the total business application constitutes the sum total of individual application subset definition files, which require significantly less resources than downloading many application subset specific clients. Intelligence or capability built into the generic client is then available to all application subsets. Resources can be released between transitions to different application subsets, meaning that an application can be virtually unlimited in depth whilst utilising only limited client-side memory and file system storage resources. In addition, this reduces application development time, as clients do not need to be coded for each specific application subset. The smart client is written without any code redundancies to ensure minimal size, in contrast to IDE code generated application subset specific clients which contain code generator redundancies.

As mentioned above, the browser-independent smart client additionally decouples the relationship of one client to a single URL. Browser-dependent unsigned generic smart clients are constrained to a one-to-one relationship between the client and the server URL. Therefore, applications hosted at the same URL referencing the same generic applet can re-use the browser cached client, but applications spread across multiple URLs need to load the same generic client separately for each separate URL referenced. In the browser-independent implementation, this restriction is overcome, as the client does not first need to be downloaded, allowing federated applications spread across a plurality of URLs.

The present invention is particularly suited to use in wireless environments, such as in WAP systems (2.5G/3G mobile communications). In standard server-client systems, a display manager comprises a windows manager. In wireless applications, a display manager manages display components and display areas on a client mobile device.

BRIEF DESCRIPTION OF THE DRAWINGS

The invention will now be described by way of an illustrative embodiment with reference to the accompanying figures in which.

DETAILED DESCRIPTION OF THE DRAWINGS

Figure 1:
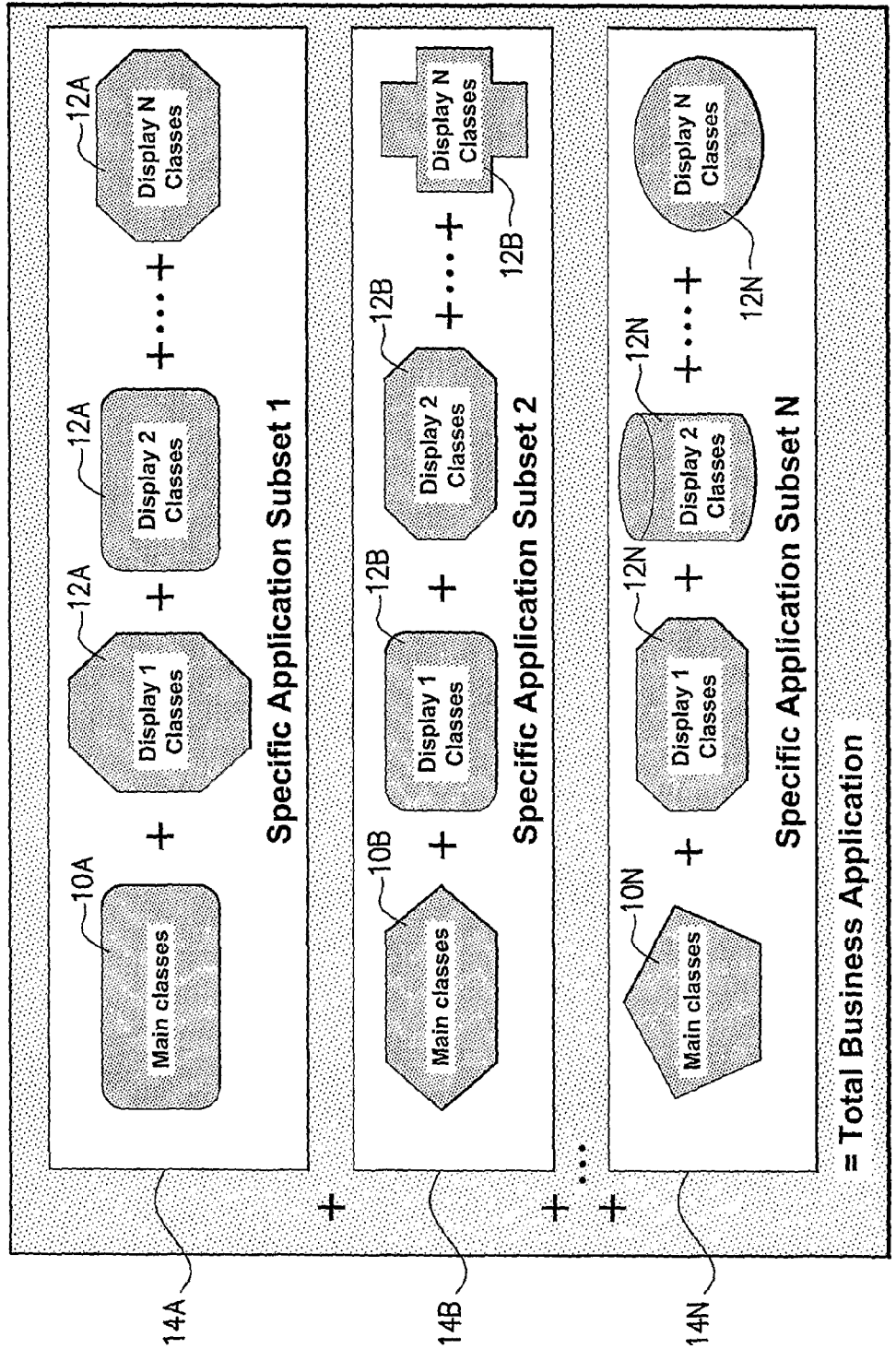
FIG. 1 illustrates schematically the traditional thin client development model of the prior art.

The following definitions are given to aid an understanding of the technical area of the present invention. A naming convention has also been adopted in this description and the accompanying drawings, wherein a single quote character "'" used after a reference numeral refers to a class, indicating an instantiated object of that class.

Java, and analogous platforms, operate by making use of programming environments including a virtual machine (such as the JVM), so that the environment can be independent of the computer operating system and processor used to execute it.

A 'thin' client is a networked client that has limited local storage, so that the storage service is generally provided on a 'fat' server. The thin client therefore requires that all objects are transferred between the server and the client. High level Java code is compiled to a compact intermediary machine-independent object code, machine-specific interpreters translating the object code at runtime to the executable computer specific code. In the case of an applet, the applet machine-independent object code—contained in classes and packaged in container files—is loaded from the server to the client and interpreted and executed in a client browser virtual machine. A browser-independent client is first installed on the client and run inside a pre-installed virtual machine on the client device.

It should be noted that, although the invention is not limited to a browser-independent engine, FIGS. 2-10 and the detailed description below relate to such an engine, the architecture including a number of features to accommodate browser independence.

The description below and accompanying figures illustrate an architecture designed for a generic smart client wireless application, but it will be understood by the skilled reader that the wireless operating environment is only one area of application of the present invention.

With reference to FIG. 1, which refers to the prior art, in the traditional thin client development model each set of main classes 10A-10N and display specific classes 12A-12N for each application subset 14A-14N is different. Each subset 14A-14N must be separately developed, tested, and downloaded to the client device. As business applications 16, such as CRM and ERP systems require many different application subsets, this can lead to high bandwidth requirements and/or poor performance. The more displays 12A-12N in an application subset 14A-14N (with the associated business logic and event handling code for each display), the greater the overall size of the specific client.

Figure 2:
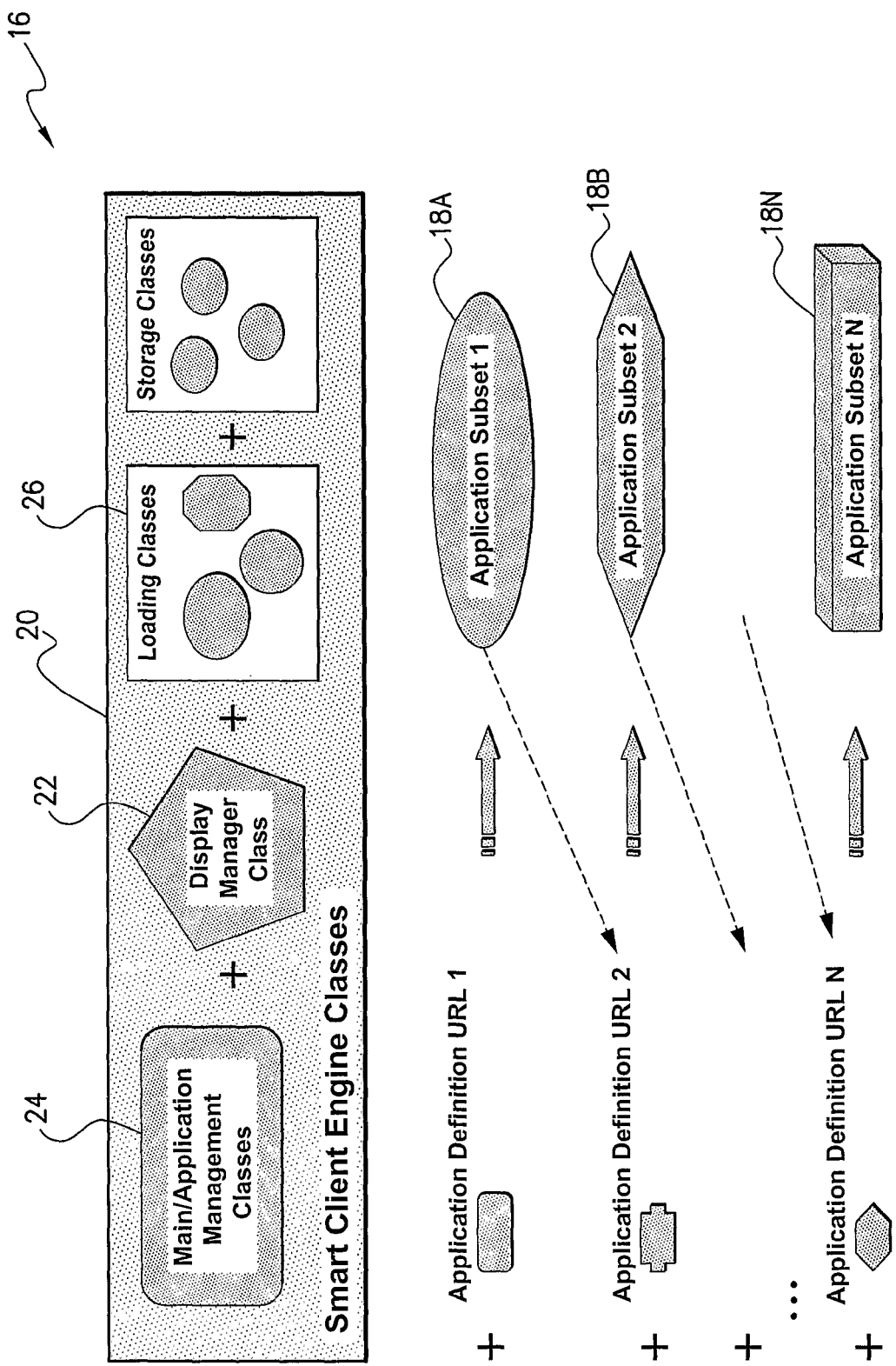
FIG. 2 illustrates schematically the smart client development model of the invention.
Figure 3:
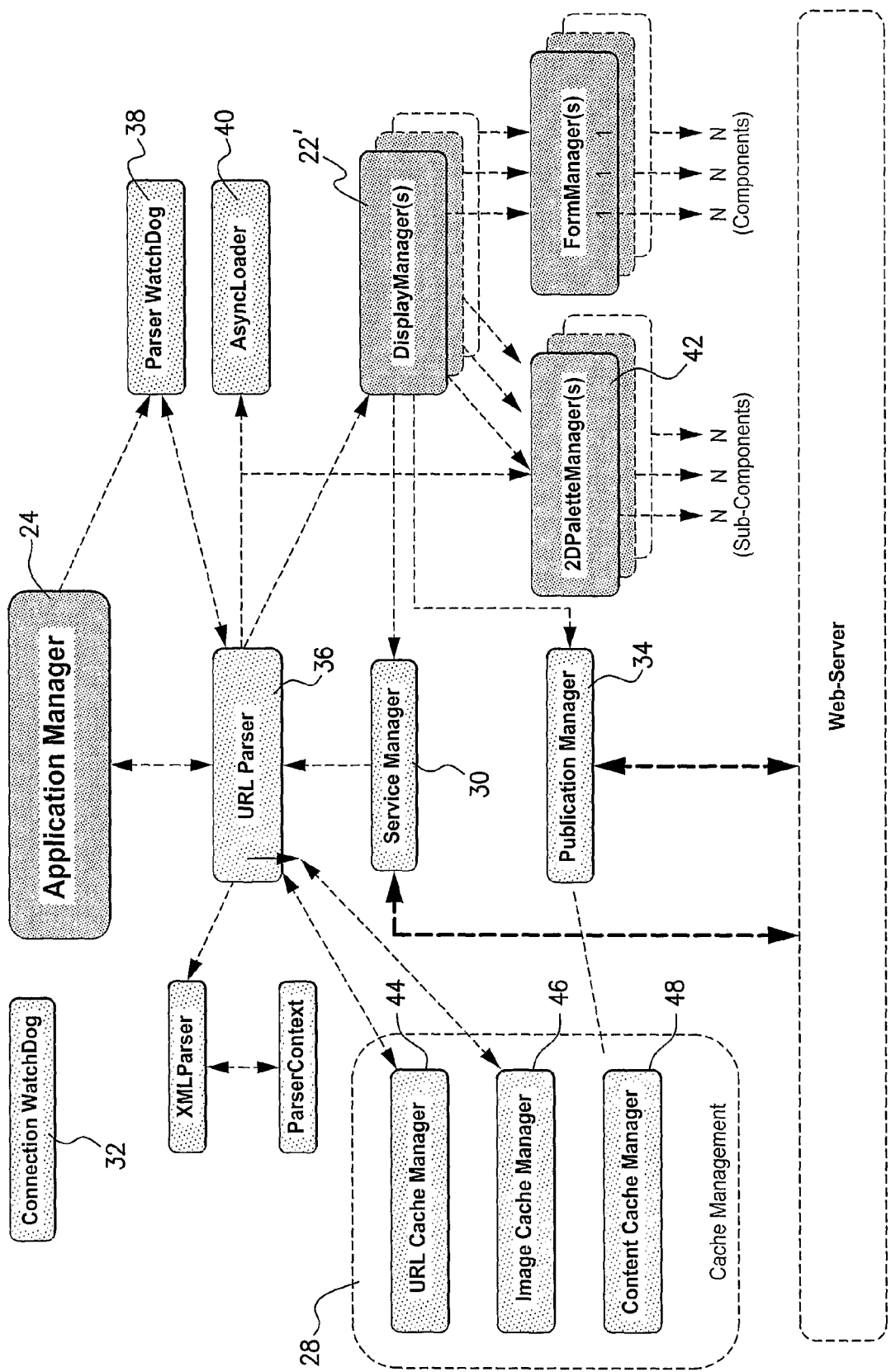
FIG. 3 illustrates schematically the key architectural components and relationships of the system of the invention.

FIG. 2 schematically illustrates the features and advantages of the smart client approach of the present invention over and above the thin client model described in FIG. 1. The total business application 16 constitutes the sum total of individual application subset definition files 18A-18N (downloaded from application definition URLs 1-N), which requires significantly less computing resources than downloading many application subset specific clients.

Importantly, intelligence and capabilities that are necessary to run the application, are built into a generic client engine 20, and are then available to all application subsets, 18A-18N.

The generic client engine 20 (or builder architecture) uses a generic display manager class to model all windows in the application 16, rather than creating separate display classes 12A-12N (FIG. 1) for each display within the application. A client-side mark-up language is used to define how a display is to appear, with the language incorporated in the definition files 18A-18N.

The application definition files 18A-18N are compressed for downloading to the client, and then act to dynamically create the displays for the application 16 at the client-side. As explained in further detail below, this approach provides the capability to (a) drill down to new application instances and (b) dynamically modify the current application instance using dynamic or static overlay. During an overlay, only information relating to data or components being added or removed needs to be defined. The system also employs vectorization to reduce the number of image downloads required.

In addition, because intelligence is provided to the client by the client engine 20, the number of server-side requests is reduced. This is done by (a) state variables storing state information at the client-side, and (b) allowing interaction between client-side components (without server-side intermediary). Cacheable client-side java beans or applets provide a mechanism for client-side interaction and service requests. Additionally, this provides a means of extending the capability of the engine 20 without adding to the engine size, thus allowing users to develop highly specialised capabilities, such as complex mathematical processing or visual interaction (eg display of rotating molecular structures).

The client-side content caching and intelligent application subsets also ensure that the client device can operate along cached pathways while offline. Furthermore, intelligent client-side content synchronization allows the client-side application to publish cached content to a server when resuming online operation.

As explained above, others have considered the challenge of developing client-side web-based applications. Unlike the present invention, these solutions have generally involved Java IDEs to code-generate business applications as a series of applets, forming on the client-side a daisy chain of such applets. Even though one particular applet may be classified as a thin client, the end result of downloading a multiplicity of applets means that the application effectively becomes a fat client.

In the invention, the generic display manager object 22 manages all the layout and components within an application display, and an application management layer 24 (see FIG. 3) manages the issues associated with an entire application segment. The application management layer governs the interaction between resident displays, asynchronous loading of images into displays and cache control. It also includes a parser module to handle the parsing of the compressed application definition configuration files 18A-18N to either transform into a new application subset (or 'client snippet') or to overlay information into the existing client snippet.

The client-side application definition files 18A-18N are based upon an application definition mark-up language, which may be XML in style or may use other simpler mark-up language forms. Under instruction from these definition files, and because of the recursive, smart nature of the client, the client can then dynamically transform itself in accordance with the pathway the user traverses at the client-side. This alleviates bandwidth limitation issues, and provides a generic framework that is then free to utilise whatever new features are provided in subsequent appropriate Virtual Machine releases.

The architecture of the invention enables rich, open and configurable, sophisticated GUI look and feel to be provided by the client in a low bandwidth environment. The architectural framework of the generic smart client of the invention is illustrated in FIGS. 3-9. These figures, in combination with the explanation below, describe the components and method steps of the invention.

The core builder architecture (or client engine) 20 consists of seven major architectural components:
Application Manager 24
Display Manager(s) 22
Load Manager(s) 26
Cache Manager(s) 28
Service Manager(s) 30
Connection WatchDog 32
Publication Manager 34

Application Manager

The application management layer 24 remains resident for the entire duration the smart client engine 20 is running. Its purpose is to provide the layer through which the engine is initialised, gateway placeholder methods for shorter duration instantiated objects to communicate, methods for memory management between application subset transitions, storage for hash tables, arrays, variables and objects of global scope (eg. Display Managers), a streaming application definition file parser to modify the current client-side application or transform it into a new application subset, an interface to online/offline cache control management classes, and placeholder methods for XMLParser, Cache Control, Connection WatchDog, Container, Display and Service management classes.

Display Manager(s)

The Display Managers 22 provide the visual components of an application subset 18A-18N where one Display Manager object manages all of the components and interactivity within an application display. An application subset can consist of multiple displays typical of any windows type application. An application subset is defined as a sliding set of dynamically generated displays that capture all of the functionality of an application subset. A total business application may consist of many (thousand or more) displays, containing different components and layouts, encapsulating and fulfilling all required business logic. An application subset represents a sliding view of a part of a total application. The navigation through the entire application is dependant upon the logical pathways between different application subsets. These pathways can be dynamically generated based upon the information stored in the current client-side application subset and transferred to the business logic hosting server, or can be static/hard-wired based upon pre-determined pathways.

The Display Managers 22' are an extension of a Display class 22 and providing storage elements and methods to offer the following functionality:
Initialisation and construction
Component and sub-component layout
Data validation
Event handling
Data synchronisation across display subset transitions both internally within an application subset and externally across application subsets.
Storage of component/container objects and associated component/container information.

Load Manager(s)

The Load Manager 26 consists of several components:
URL parser: This object asynchronously loads and parses remote application subset definition files 18A-18N creating DisplayManager objects 22' for each new display and instantiating, storing and layout-constraining container/component objects and reference information in the specified displays. In the case of existing displays, components are modified or removed as instructed. The URL Parser 36 also provides application definition caching for both server-side static and dynamically generated application subset config URLs. If the device connection status is offline, requests to load target URL configuration files or to perform server-side services will be retrieved from the cache (if they have been cached). The URL Parser object 36' works in conjunction with the cache manager 28 to minimise network downloads and ensure application continuity in an intermittent network environment.

WatchDog: This class 38 is instantiated by the URL Parser object 36 and performs a timeout on the URL Parser thread. If the URL Parser load time exceeds the configurable timeout period the WatchDog thread kills the parent URL Parser thread. If the URL Parser thread loads the remote application definition URL before the WatchDog thread times out, the URL Parser thread kills the WatchDog thread.

AsyncLoader: This class 40 is instantiated at the end of the URL Parser thread lifespan and directs each current application display manager 22' to draw image and 2D vector sub-components in contained 2D palette components 42.

Cache Manager(s)

The cache management 28 consists of three components:
Application subset/Target URL caching 44
Image caching 46
Content caching 48

Target URL Cache Management

Target URL cache management is handled by the URL-CacheManager class 44 and is instantiated by the URL Parser 36 in different ways subject to client device connection status.

The purpose of the URL cache manager is to control caching of target URL configuration file and service request, responses, and retrieval from the cache depending on device connectivity and target URL age relative to the cache. In the wireless environment the purpose of the cache manager 44 is two-fold:
 load performance in a limited bandwidth environment; and
 application continuity in an intermittent network environment.

In this environment a trade-off between application subset newness and continuity is necessary.

If the device is offline, the static target URL or service, plus component name value pairs are used as the key to retrieve the previously cached target or service response. If the target URL or service response has not been cached, the static or dynamic service request is ignored.

If the device is online, a remote static target URL size and date is compared against a cached version. If the remote target URL is newer than the cached version, the remote version is loaded and stored in the cache using the target URL as the data store key. If the cache does not contain a target URL version it is simply loaded remotely and then cached locally. In the case of a server-side service request, the service is issued to the server-side and the response is cached after being parsed and processed by the URL Parser 36.

Image Cache Management

The image cache manager 46 controls the caching of images after they have been loaded. It also controls the flushing of images, first from the memory cache to the client-side data store and eventually from the data store when storage has been exceeded on a last-in first-out basis. The number of images that can be cached is entirely dependent upon client-side memory and storage capacity and will vary from device to device.

Content Cache Management

Content cache management 48 refers to the caching of collected data while the device is offline. A service of type 'save' attached to a component saves all component name/value pairs in the local device data store that are a part of the save service group. The purpose of this facility is to allow the mobile device to be used as a data storage device during offline operations. This capability, used in conjunction with target URL caching, means a device can be offline and continue to execute the cached set of target URL application subsets 18A-18N, capturing and storing data as requested.

The ability to save data is of no use unless a complimentary publication capability is provided to push that data via service requests to server-side networks when online. This can be done via a direct "publish" service attached to a display component referencing a cached service-group, or via an asynchronous publication manager 34 that wakes up every nominated period, checks device connectivity status, and if connected issues a publish service for all publication service-groups.

Cache Pre-loading

Pre-loading of both the TargetURLCache 44 with pre-defined application subsets and the Image Cache 46 with referenced images by those application subsets would allow the device to be used as a pre-configured offline data capture device. It allows rapid configuration of devices for multiple purposes. This is done by providing an archival retrieval service that places the entire contents of the retrieval response directly into the device cache.

Service Manager(s)

The service manager 30 is instantiated in response to an event initiated by a display component that has a server-side target service attached. This class controls the issuing and response to a server request. A successful response is handled by creating a URL Parser object 36' to parse the response to the service request. The parser performs a streaming parse of the response, and creates or modifies displays, containers, components or sub-components in response.

Connection WatchDog

The connection watchdog 32 monitors the connection status of the client device to the wireless network. It does this by issuing a server-side request every nominated period. If the request times out, the device sets a global connection status flag to false; otherwise the flag is set to true. The connection status flag is used by both the cache management class 44 and publication management class 34 to control cache retrieval of application subsets and content along with synchronization of offline stored client-side data.

Publication Manager

The publication manager 34 wakes up every nominated period, checks the connection status and attempts to push/flush client-side stored data to the server. The publication manager can also be invoked directly from display components with attached services tagged with a publish tag.

Figure 4:
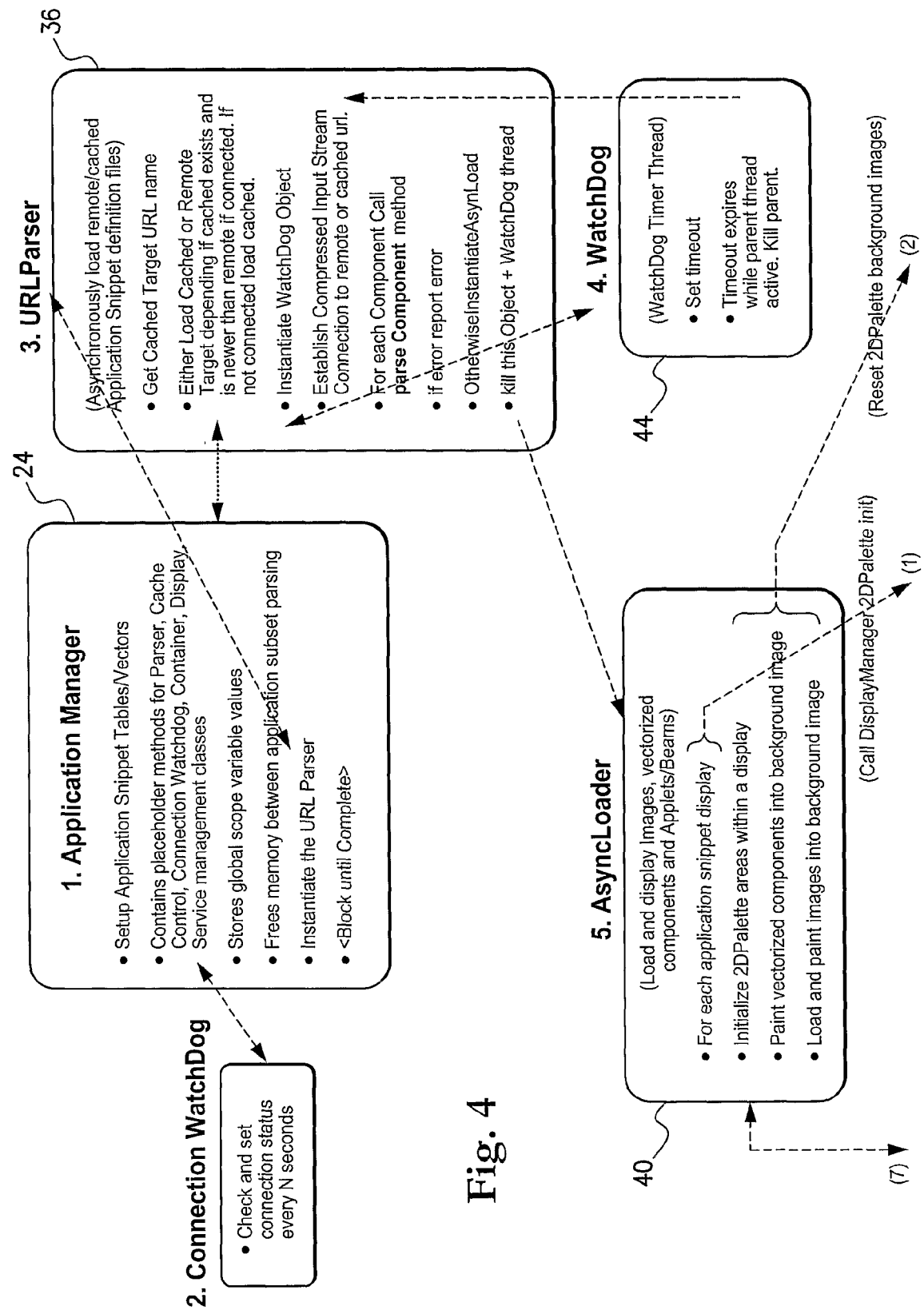
FIG. 4 illustrates schematically the initialisation and loading phase of key components of the architecture of the system of the invention.
Figure 5A:
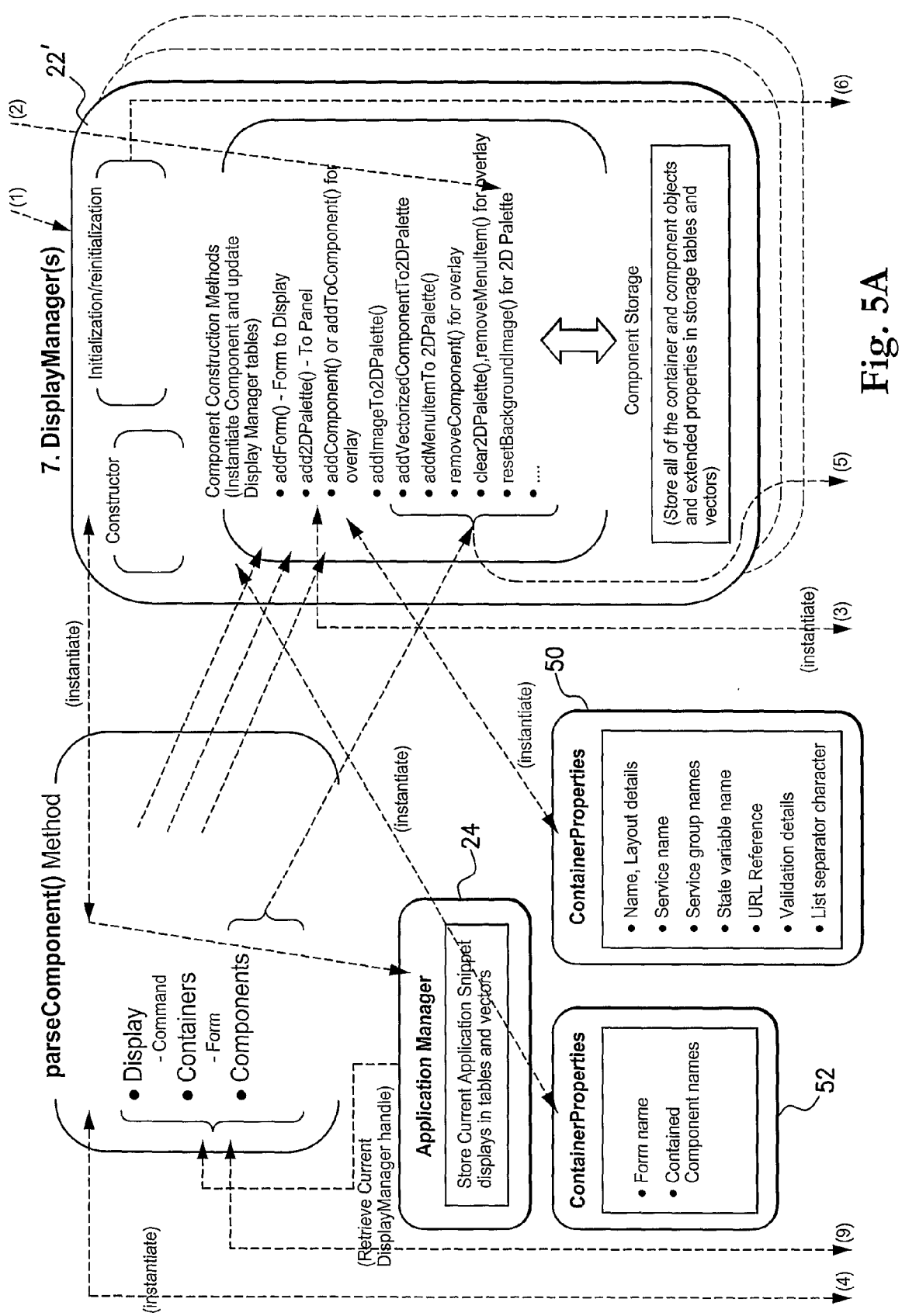
FIGS. 5A and 5B illustrate schematically the construction phase of the application subset(s)
Figure 5B:
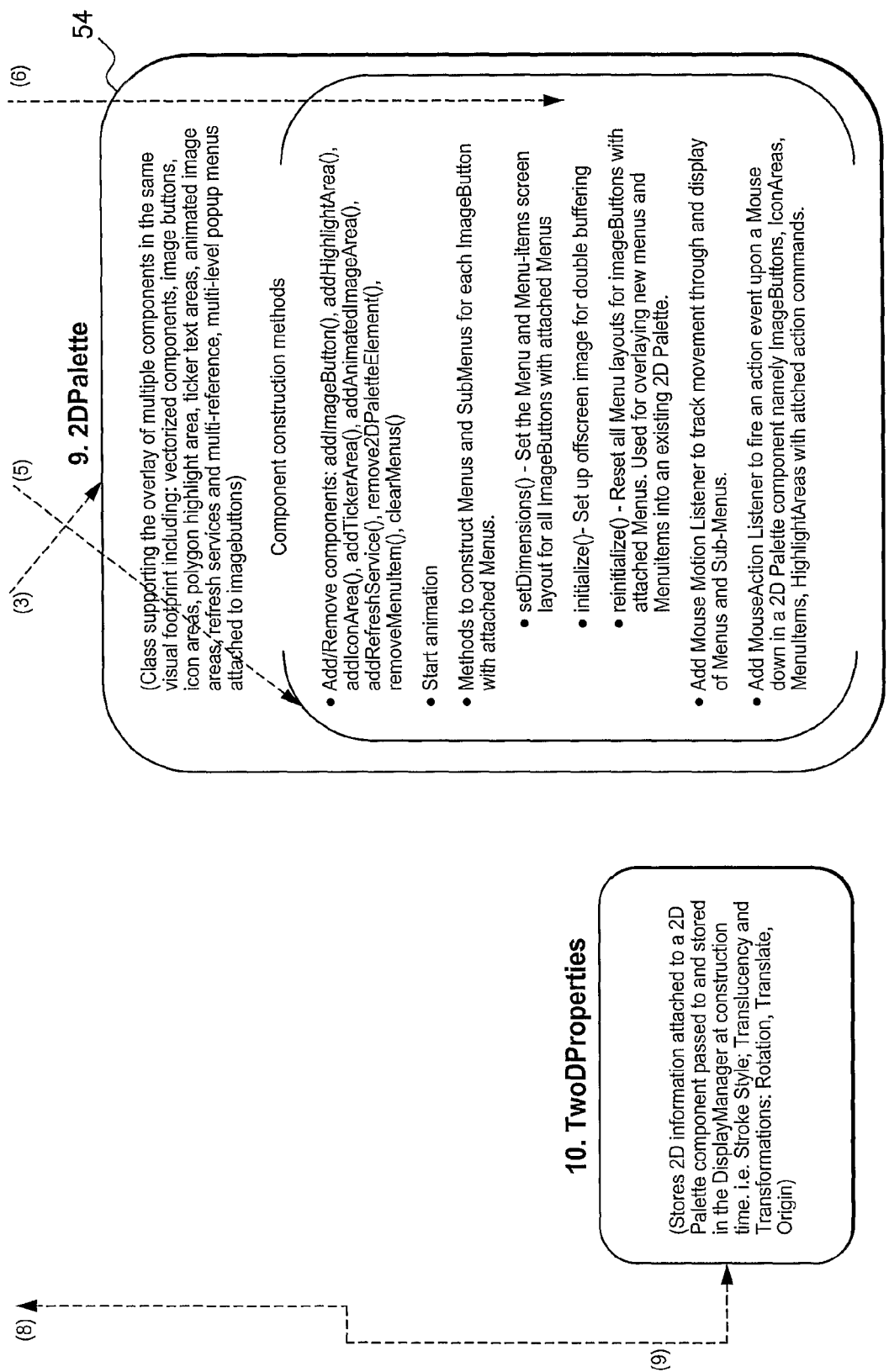

Turning to FIGS. 4, 5A and 5B, the processes involved during the initialisation, loading and construction of an application subset 18A-18N will be described.

The Application Manager class 24 manages all initial configuration parameter settings, the setup of tables, dynamic arrays and parameters of global scope.

At the end of initialisation the URLParser class 36 is instantiated to load and parse the entry point target URL. The URLParser object 36' creates the entry application subset including displays with containers, components, sub-components and all of their associated information and passes this to the specified DisplayManager object 22'.

The parseComponent( ) method parses all of the container, component or sub-component parameters and values. The DisplayManager object 22' is instantiated by the parseComponent method when it encounters a DISPLAY or WINDOW token. Subsequent components referencing this same frame are added to the display specific DisplayManager object 22'. The DisplayManager object 22' manages the storage, layout, additional reference information and event handlers for each container/component/sub-component.

The URLParser object 36' completes by instantiating the AsyncLoader class 40 to manage the progressive display of images in reference display 2D palette components. The AsyncLoader 40 also initialises all 2D palette components in each display. 2D palette initialisation involves the construction of the 2D palette background image and the sizing of Menus, Sub-Menus and SubMenuItems for menus attached to ImageButtons.

The 2D Palette 42' is designed to provide a component allowing multiple sets of visual functionality in the same visual footprint including deeply nested menus.

The WatchDog class 44 ensures the target URL is loaded within a configurable upper limit. If the WatchDog 44' expires while in the process of loading the target URL, the WatchDog kills the URLParser thread, otherwise the URLParser kills the WatchDog thread.

The URLParser 36 performs a streaming load and parse of the target URL.

Components of type DISPLAY/WINDOW result in the instantiation of a DisplayManager object 22', which is an extension of a Display class. All the attributes of the display (width, height, title, anchor position, background color etc) are passed to the DisplayManager 22'. Subsequent components 50, containers 52 and sub-components are added to the DisplayManager object 22'.

Containers 52 include Forms and Contained components.

Components 50 include TextFields, TextBoxes, CheckBoxes, Radio Buttons, Image Items, Buttons, Popup Menus, ListBoxes, Gauges, Labels, 2DPalettes and vectorized sub-components: Arcs, Lines, Rectangles, Ovals, Polygons, Polylines, Icon Areas, Image Buttons, Highlight Areas, Animated Image Areas, Ticker Text Areas etc. Each type of component/sub-component has associated parameters and configuration information which is all stored in tables and vectors of generic storage classes (ComponentInfo) in each DisplayManager-object 22'.

Likewise with containers 52, where configuration information is stored in tables and vectors of ContainerInfo classes.

2DPalette components 54 can have 2D properties associated with them and this information is passed through to the specific DisplayManager 2DPalette referenced.

Each DisplayManager object reference is stored in ApplicationManager tables and vectors for retrieval at any time.

The parsing of components is not restricted to addition of components, sub-components or containers. Included in the application definition protocol are tokens to specify component/sub-component removal or modification to allow modification of an existing application without the need for reloading an entirely new application that is almost identical to the current one.

Figure 6:
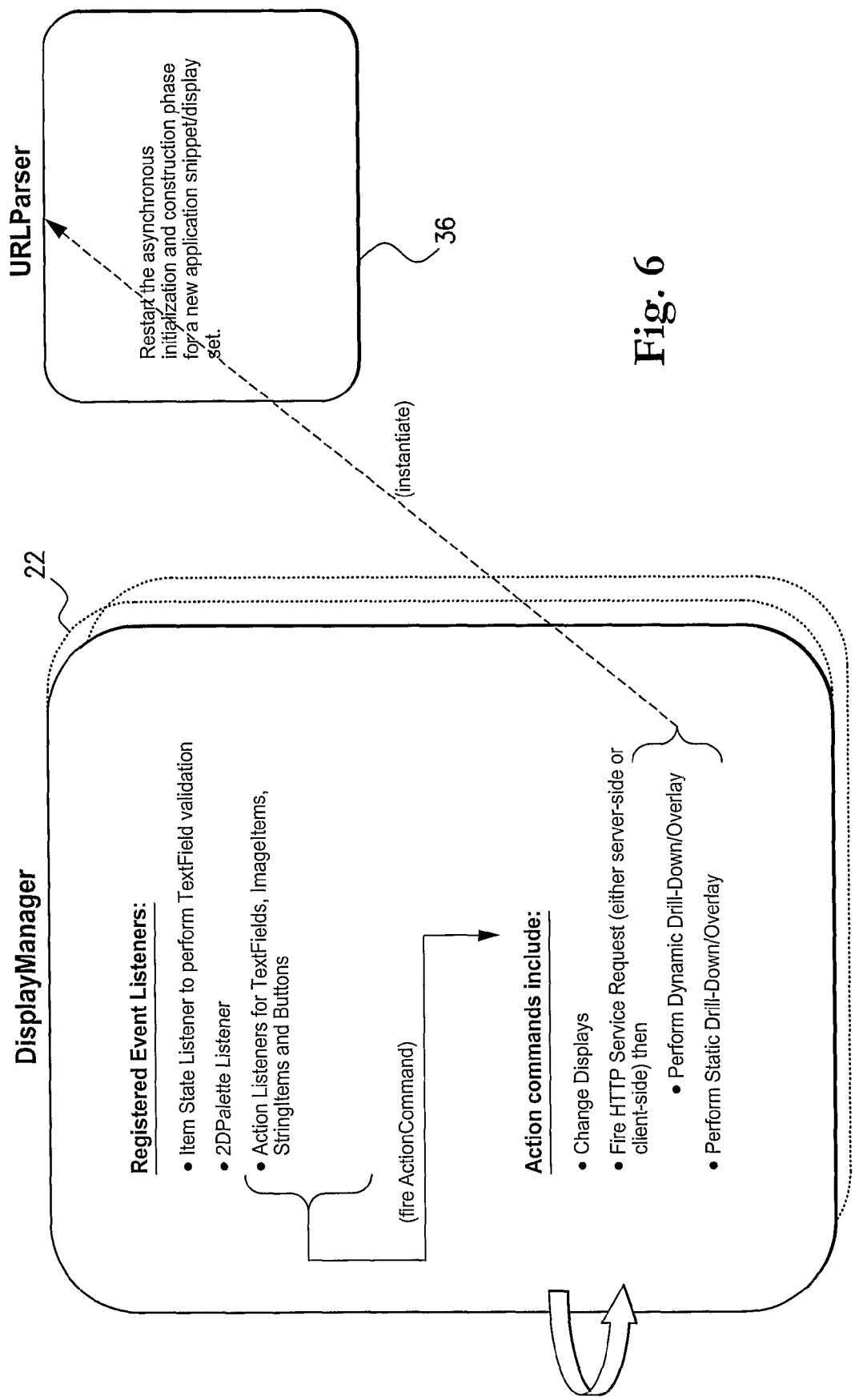
FIG. 6 illustrates schematically the event handling phase.

FIG. 6 illustrates the Event Handling Phase. Attached to a number of components are keyboard and mouse listeners to capture a key being hit and/or Mouse Pressed mouse action. If the component has a service and/or a target URL attached a process of application transformation begins.

The component can issue a server-side HTTP POST or GET request and/or load a new target URL application definition subset file 18.

If the gotoref value is only a framename and the service value is a servlet or cgi service name, a dynamic drill-down or overlay is performed. Firstly the server-side service is called passing all the component-name-value pairs for components in the same service group as the initiating component. If the framename specified in the gotoref exists in the current application subset, a dynamic overlay is performed otherwise a dynamic drill-down to a new application subset is performed.

i.e. service=/servlets/myservlet gotoref=FRAME_HOME

If a service name is not specified but the gotoref contains both a frame name and a full URL name then either static drill-down or static overlay is performed.

i.e. gotoref=FRAME_XYZ,http://www.abc.com/myconfig.zip

In the case where the frame name exists in the current application subset a static overlay is performed, otherwise a static drill-down is performed.

Other actions include: exiting the application; changing the displays, clearing all display components content, saving all display components content to a local device storage, and publication of saved data to the server.

Figure 7:
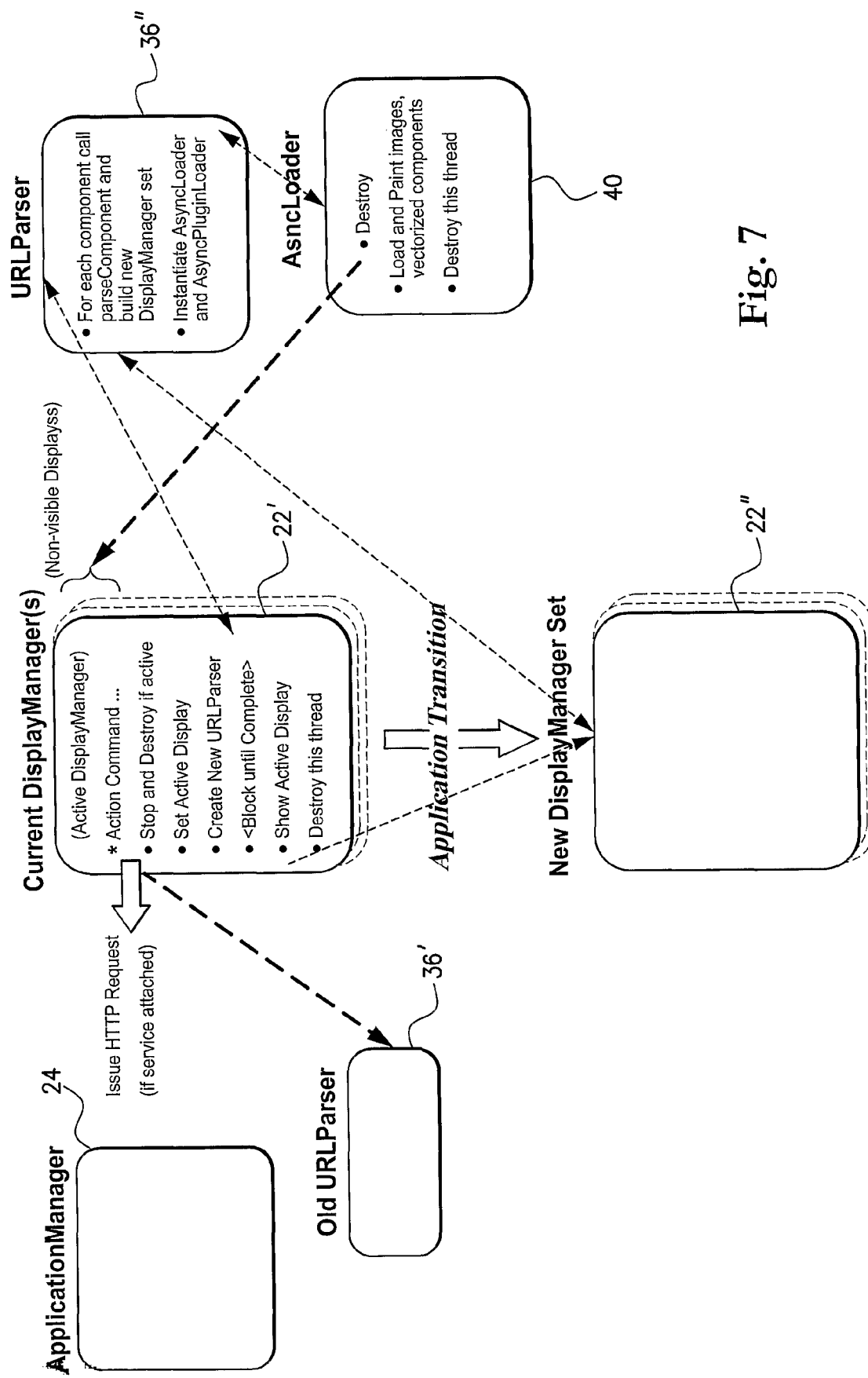
FIG. 7 illustrates schematically the display transition phase drill down process.
Figure 8:
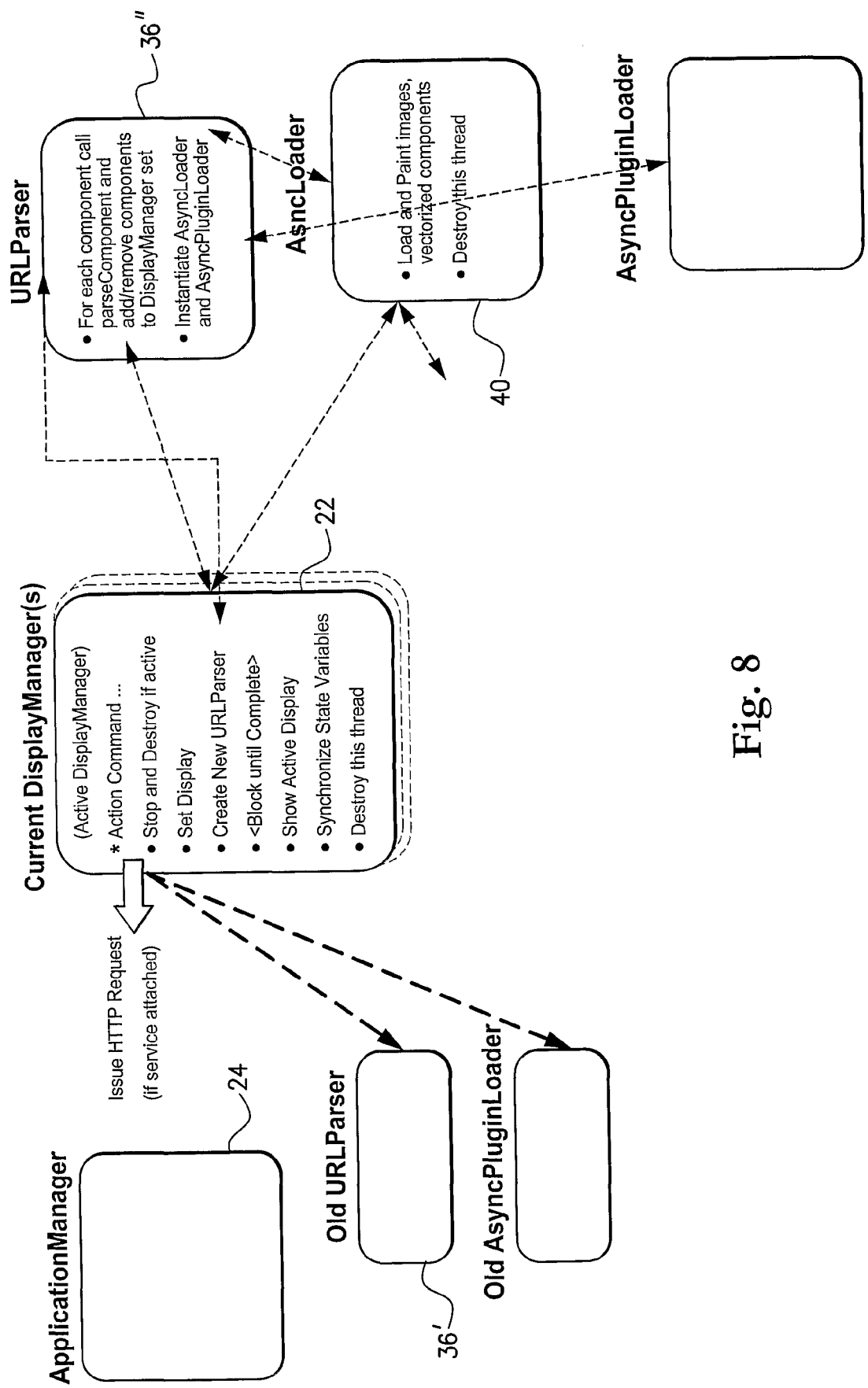
FIG. 8 illustrates schematically the display transition phase overlay process.

FIG. 7 and FIG. 8 show in more detail the drill-down and overlay processes respectively.

Drill-Down: When a drill-down request is issued from the current application subset a URLParser class 36 is instantiated to load and parse the new target URL. This is performed by a placeholder method in the Application Manager 24 which also instantiates an AsyncPluginLoader (not shown) to load 3rd party Applet/javaBean container URLs. The details of how to issue a drill-down as opposed to an overlay are outlined in the event handling phase detail included in FIG. 6.

The new URLParser 36" loads and parses the new target URL and dynamically constructs the new application subset. Before the URLParser thread 36 destroys itself, it instantiates the AsyncLoader class 40 to begin the process of progressive loading of images into the new application subset. The AsyncLoader 40 first destroys the previous application subset displays and transfers control to the new application subset.

When the images are loaded and displayed in the current application subset, the AsyncLoader 40 and the AsyncPluginLoader thread have completed and all JavaBeans and Applets are loaded, placed and started in the current application subset from their locally cached repositories.

Overlay: In the overlay process, the URLParser 36 is also instantiated to load and parse the new target URL, however none of the current DisplayManagers 22' or ImageConstructManagers (not shown) are destroyed. Components, containers and sub-components are added or removed from the current application subset and the ImageConstructManagers to load and display new and existing images, and vectorised and 2D components. Images already loaded are retrieved from the in-memory cache (not shown) or local cache (not shown) so delays are minimal. New images, however, are loaded remotely and cached. The overlay process also accommodates for image and vectorised component removal.

The overlay facility provides the mechanism for client-server style computing over the Internet, as it allows the current application subset to be modified without reloading and reconstructing the entire application subset.

State Variable Synchronization: This is required in the following situations:

Transition from one display to another within an application snippet

Transition from one tab pane to another within a tab pane component

Drill-down transition from one application snippet to another

During a static or dynamic overlay.

For state variable synchronisation, each component can optionally have a state variable name associated with it. During any of the above transitions, the value of components will be transferred from the component to a state variable table stored in the Application Manager 24. After all origin Display/Tab Pane components have updated the state variable table in the Application manager, the target Display/Tab Pane components with state variable names attached retrieve values from the state variable table in the application manager to set as their value.

Automatic state variable synchronisation is used to remove the need for a service request to handle component data synchronisation during display/tab-pane transitions, and to minimise the amount of work required by application developers.

Figure 9:
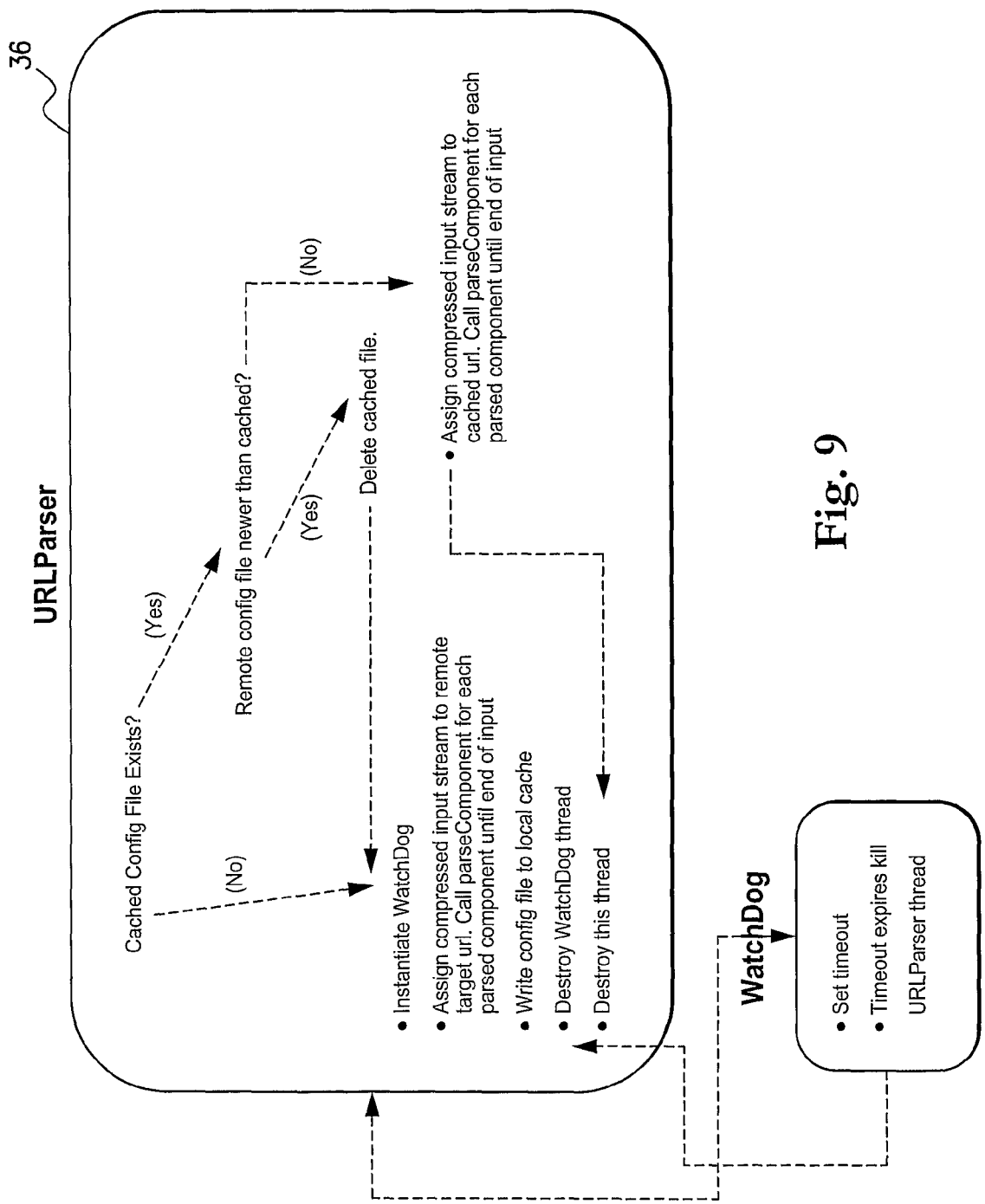
FIG. 9 illustrates schematically the caching of the application target URL.

FIG. 9 Shows how the application subset target URL is cached.

The URLParser 36 checks to see if the target URL exists already in the cache and has not been superseded by a more recent version. If it exists and is still current it loads the application subset target URL from the local cache and parses this file. Otherwise the target URL is loaded remotely and then cached to the local file system.

structure. Applications therefore look and perform as if the software is locally installed, even though most of the code is in fact on the server. The invention enables users to interact in a full GUI environment, and can therefore by used to provide usual windows functionality (such as sorting of table and resizing of columns, dynamically zooming in and out of images, and dragging and dropping items, etc).

Testing by the applicant has shown that this ultra-thin operating environment can reduce browser-server traffic by up to ten times.

As mentioned above, the generic recursive client engine of the invention allows complex display-based business applications to be constructed from significantly less downloaded data than would be required with a conventional thin client. This provides a significant saving in download time over the duration of a business application. In fact, the comparison between a 'smart client' and a 'thin client' actually improves as the complexity and size of business application increases.

Conventional thin-client business solutions require a daisy-chaining together of thin-clients, each providing a segment of a total business application. The following table illustrates by way of a typical example of a total business solution (which involves an initialisation step and five application segments Seg. 1-5) the difference in total application download between the two methodologies.

| Client | Initial | Seg. 1 | Seg. 2 | Seg. 3 | Seg. 4 | Seg. 5 | Total |
|---|---|---|---|---|---|---|---|
| Thin | 40 kb | 40 kb | 50 kb | 30 kb | 20 kb | 40 kb | 220 kb |
| Smart | 80 kb (1$^{st}$ time only) | 5 kb | 10 kb | 2 kb | 5 kb | 8 kb | 110 kb |

Figure 10:
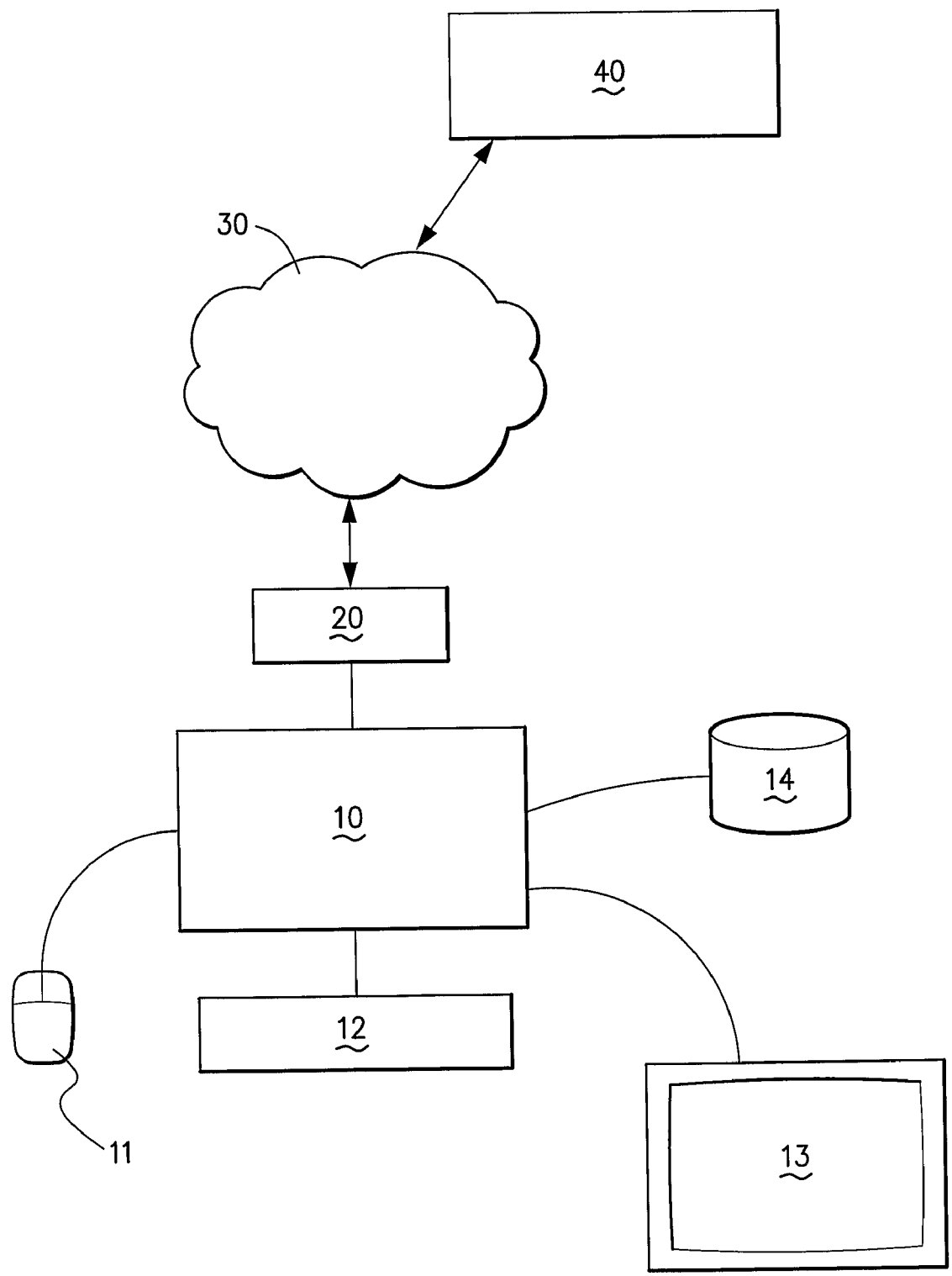
FIG. 10 illustrates the components of an operating environment suitable for supporting the present invention.

As shown in FIG. 10, a digital computer 11 is connected to a pointer device 13 (eg a mouse or trackball), a keyboard 15, a display unit 17, and a disk storage unit 19. Computer 11 includes a CPU and a memory unit (not shown) and connects to a network interface 21. This enables communication via a network 23 (such as the Internet) with remote server 25. Such a system is configurable to be capable of executing procedures that embody the present invention.

The invention, then, serves to allow the download of a total business solution in a small bandwidth footprint. It involves, in effect, an application serving engine, not a content serving engine, and allows users to traverse a plurality of applications on the Internet which may be functionally interconnected or disparate. By way of examples, these may be manufacturing systems, ERP systems, CRM systems, financial systems, etc.

In one embodiment of the invention, the concept is enabled on a browser-independent form. This engine can handle all the image and configuration file caching, and the application is no longer restricted to a single URL. Applications can be spread across multiple URLs allowing for the creation of a 'federation' of associated applications. Using such a system, for example, a user can view multiple manufacturing applications hosted across a plurality of separate locations, and then drill into an integrated financial system hosted elsewhere.

The invention therefore provides a more distributed system then hitherto possible, as business logic presentation and storage are distributed to the client-side application layers. However, applications can still be centrally managed. Importantly, the system is fully compatible with existing web infra- In the wireless environment, the invention is suitable for use with USSD technology (Unstructured Supplementary Service Data). Supported by WAP, USSD is a technology unique to GSM and built into the GSM standard for support of transmission of data over the signalling channels of the GSM network. USSD provides session-based communication, enabling a variety of applications. USSD provides an ideal mechanism by which a mobile device can be used to trigger or access mobile services such as callback, interactive massaging, information enquiry services, banking services, customer service and mobile chat.

By way of example, a banking application can be enabled using the method and system of the invention. Via a cellular network and a firewall system, a mobile user communicates with a banking server. By way of his mobile device, the user connects to the URL of the banking server, and the engine and cache are downloaded to the mobile device. A certificate check and public key exchange between the banking server and mobile device then takes place, and if successful the system enters secure session mode. The user then performs a login with his username, account ID, password and mobile device ID. Failure up to 3 times is permitted, and once the login has been successfully completed a multi-level list of accounts and action options is presented to the user. In accordance with the selected option (for example, 'transfer amount', 'pay bill', return to options', 'logout', etc), context-specific application segments are provided to the mobile device, by way of individual application subset definition files.

Modifications and improvements to the invention will be readily apparent to those skilled in the art after consideration of the above complete specifications. Such modifications and improvements are intended to be within the scope of this invention, which is defined solely by reference to the following claims.

The word 'comprising' and forms of the word 'comprising' as used in this description and in the claims does not limit the invention claimed to exclude any variants or additions.

The invention claimed is:

1. A method for use in running a display-based computer application, the display-based computer application comprising a plurality of application segments, involving distributing computing between a server on a server computer and a client on a client computer, the server computer and the client computer operatively interconnected by way of a computer network, the method comprising the steps of:
   (a) providing, by the server computer, a generic client engine to the client computer, the generic client engine comprising:
      (i) an application manager defining an application instance of the display-based computer application on the client computer,
      (ii) a display manager for each application segment of the plurality of application segments, the display manager serving to manage displays on the client computer generated by the display-based computer application, wherein the display manager is an instance of a generic display manager class configured to model all of a plurality of display elements of the display-based computer application; and
      (iii) one or more load managers for loading and parsing individual application subset definition files,
   (b) providing, by the server computer, a collection of the individual application subset definition files to the client computer, wherein each of the individual application subset definition files relates to one of the plurality of application segments,
   wherein the server delivers an application subset definition file responsive to a request from an application segment of the plurality of application segments,
   wherein the application subset definition file comprises parsable instructions for the application segment, using a load manager of the one or more load managers, to perform at least one selected from a group consisting of:
      modify a respective display manager, corresponding to the application subset definition file, by way of a recursive transformation within the application instance, and
      remove the respective display manager and create a new display manager, and
   wherein the load manager is instantiated on the client computer in response to the request.

2. The method according to claim 1, wherein at least one application subset definition file of the individual application subset definition files defines components or layout characteristics within at least one display area associated with a respective application segment of the plurality of application segments.

3. The method according to claim 2, wherein the at least one application subset definition file defines only information relating to the components or the layout characteristics to be added or removed between successive client updates.

4. The method according to claim 1, wherein the individual application subset definition files are formatted in an application definition mark-up language.

5. The method according to claim 1, wherein the application manager is adapted to run as a separate client-side layer, to manage variables associated with each application segment of the plurality of application segments, the application manager including:
   (a) controlling logic for controlling interaction between resident display areas;
   (b) loading logic for asynchronous loading of images into the resident display areas;
   (c) caching logic for controlling caching of images; and
   (d) parsing logic for parsing the individual application subset definition files.

6. The method according to claim 5, wherein the parsing logic is adapted for parsing compressed application definition files.

7. The method according to claim 5, wherein the caching logic includes logic to destroy in a client memory, after a cache period, cached images for at least one application segment of the plurality of application segments when initiating the caching of cached images for a subsequent application segment of the plurality of application segments.

8. The method according to claim 1, wherein the application manager includes at least one of a group consisting of:
   (a) gateway placeholder logic for short-duration instantiated objects;
   (b) memory management logic between application subset transitions;
   (c) storage logic for hash tables, arrays and variables; and
   (d) interface logic to online/offline cache control management classes.

9. The method according to claim 1, wherein the display manager includes at least one of a group consisting of:
   (a) initialisation and construction logic;
   (b) component and sub-component layout logic;
   (c) data validation logic;
   (d) event handling logic;
   (e) logic for data synchronisation across display subset transitions both internally within an application subset and externally across application subsets; and
   (f) logic for storage of component or container objects and associated component or container information.

10. The method according to claim 1, wherein the one or more load managers include one or more of the following components:
   (a) uniform resource locator (URL) parser logic to asynchronously load and parse remote application subset definition files by way of URL parser threads;
   (b) watchdog logic configured to be instantiated by the URL parser logic to perform a timeout on a URL parser thread; and
   (c) loader logic configured to be instantiated at the end of a URL parser thread lifespan.

11. The method according to claim 1, wherein the generic client engine further includes one or more publication managers, configured to periodically check the connection status with the server computer and to invoke delivery of client-side stored data to the server computer.

12. The method according to claim 1, implemented in a browser-independent manner.

13. A non-transitory computer readable medium comprising a computer program stored thereon, which when executed causes a computer to perform the method according to claim 1.

14. A distributed computing system for running a display-based computer application, the display-based computer application comprising a plurality of application segments, the system comprising:
   (a) a client device;
   (b) a server computer operatively interconnected to the client device by way of a computer network;
   (c) a generic client engine provided by the server computer and installed on the client device, the generic client engine comprising:
      an application manager defining an application instance of the display-based computer application,
      a display manager for each application segment of the plurality of application segments, wherein the display manager serving to manage displays generated by the display-based computer application, and
      one or more load managers for loading and parsing individual application subset definition files,
      wherein the display manager is an instance of a generic display manager class configured to model all of the display elements of the display-based computer application; and
   (d) a collection of the individual application subset definition files provided by the server computer to the client device, wherein each of the individual application subset definition files relates to one of the plurality of application segments,
   wherein the server delivers an application subset definition file responsive to a request from an application segment of the plurality of application segments,
   wherein the application subset definition file including parsable instructions for the application segment, using a load manager of the one or more load managers, to perform at least one selected from a group consisting of:
      modify a respective display manager, corresponding to the application subset definition file, by way of a recursive transformation within the application instance, and
      remove the respective display manager and create a new display manager, and
   wherein the load manager is instantiated on the client computer in response to the request.

15. The system according to claim 14, wherein at least one application subset definition file of the individual application subset definition files defines components or layout characteristics within at least one display area associated with the respective application segment.

16. The system according to claim 15, wherein the at least one application subset definition file defines only information relating to component or layout characteristics to be added or removed between successive client updates.

17. The system according to claim 14, wherein the application manager is adapted to run as a separate client-side layer, to manage variables associated with each application segment, the application manager including:
   (a) controlling logic for controlling interaction between resident display areas;
   (b) loading logic for asynchronous loading of images into the resident display areas;
   (c) caching logic for controlling caching of images; and
   (d) parsing logic for parsing the individual application subset definition files.

18. The system according to claim 17, wherein the parsing logic is adapted for parsing compressed application definition files.

19. The system according to claim 17, wherein the caching logic includes logic to destroy, in a client memory, cached images for at least one application segment of the plurality of application segments when initiating caching of cached images for a subsequent application segment of the plurality of application segments.

20. The system according to claim 14, wherein the application manager includes at least one of a group consisting of:
   (a) gateway placeholder logic for short-duration instantiated objects;
   (b) memory management logic between application subset transitions;
   (c) storage logic for hash tables, arrays and variables; and
   (d) interface logic to online/offline cache control management classes.

21. The system according to claim 14, wherein the at least one display manager includes at least one of a group consisting of:
   (a) initialisation and construction logic;
   (b) component and sub-component layout logic;
   (c) data validation logic;
   (d) event handling logic;
   (e) logic for data synchronization across display subset transitions both internally within an application subset and externally across application subsets; and
   (f) logic for storage of component or container objects and associated component or container information.

22. The system according to claim 14, wherein the one or more load managers include one or more of the following components:
   (a) uniform resource locator (URL) parser logic to asynchronously load and parse remote application subset definition files by way of URL parser threads;
   (b) watchdog logic configured to be instantiated by the URL parser logic to perform a timeout on a URL parser thread; and
   (c) loader logic configured to be instantiated at the end of a URL parser thread lifespan.

23. The system according to claim 14, wherein the generic client engine further includes one or more publication managers, configured to periodically check the connection status with said server computer and to invoke delivery of client-side stored data to the server computer.

* * * * *